Feb. 2, 1943.　　　F. F. LÁZAGA　　　2,309,912
PROGRESSIVE SPEED RATIO TRANSMISSION
Filed Feb. 11, 1942　　　2 Sheets-Sheet 2

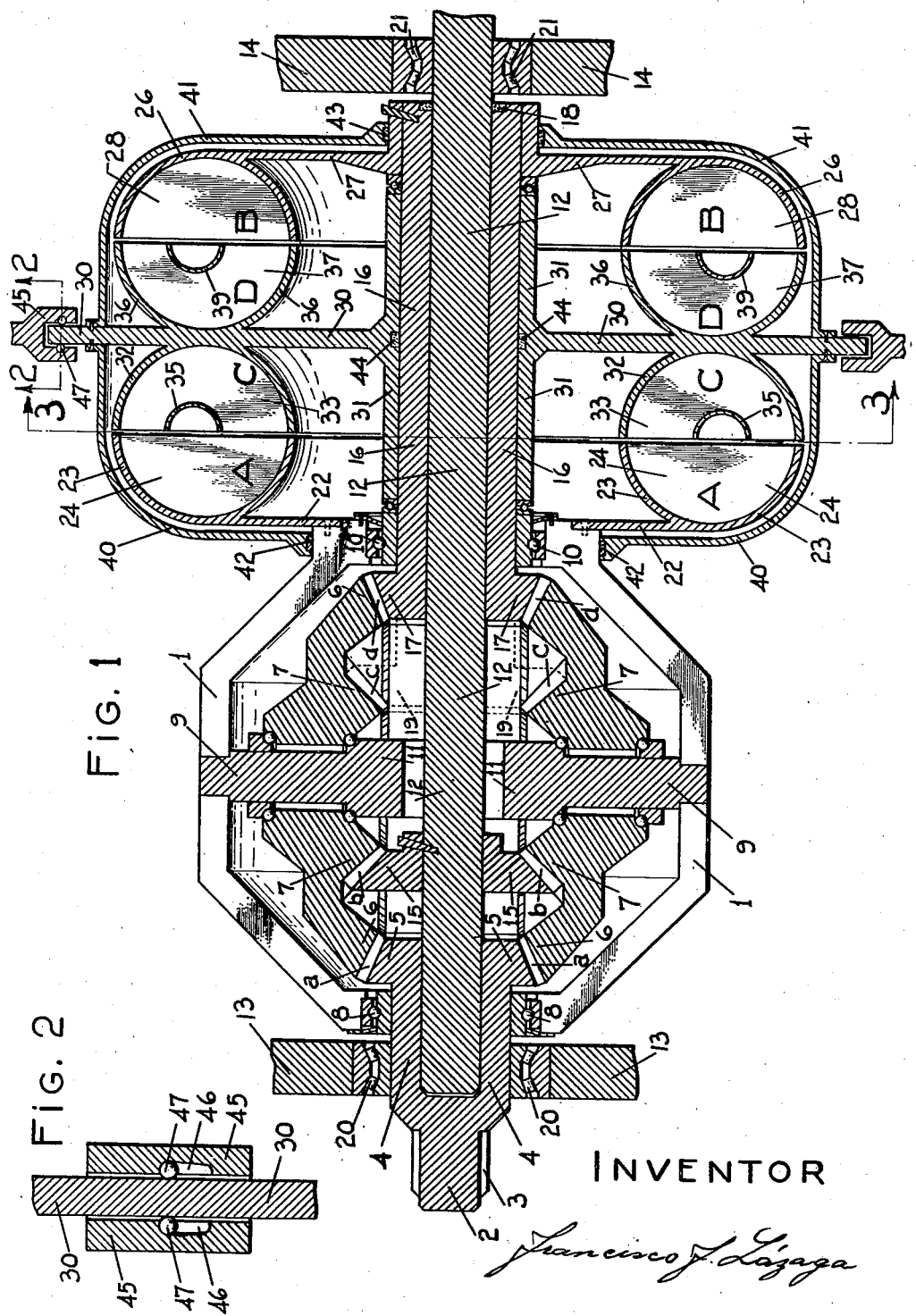

INVENTOR
Francisco F. Lázaga

Patented Feb. 2, 1943

2,309,912

UNITED STATES PATENT OFFICE 2,309,912

PROGRESSIVE SPEED RATIO TRANSMISSION

Francisco F. Lázaga, Vibora, Habana, Cuba

Application February 11, 1942, Serial No. 430,372

2 Claims. (Cl. 74—189.5)

My invention relates to means to produce a continuous gear ratio changing effect in the "differential transmission," United States Patent No. 2,247,578 of July 1, 1941.

My invention may be described as improvements to be used in connection with the above mentioned patent, whereby the friction brakes A, B, D and clutch C are abolished.

The objects of my invention are: first, to provide a device which will maintain all the gears engaged; second, a device which will regulate the power and motion transmitted from a driving shaft to a transmission shaft; third, to provide means so that the transmitted motion be in the same direction as the initial motion; fourth, to provide means so that the motion transmitted in-direct, to be without the running of gears; fifth, to provide means to produce a continuous intermediate gear ratio changing effect, from a low speed gear to a high speed gear ratio, by the independent action of two pairs of torus fluid members; sixth, to provide means to have the entire device supported by a central shaft.

Other objects and advantages will be understood from the following description. I have attained these objects by means of the mechanism illustrated in the accompanying drawings, in which:

Fig. 1 shows a horizontal section through the transmission device.

Fig. 2 shows a detailed section through line 2—2 Fig. 1.

Similar numerals and letters refer to the same or similar parts throughout the different figures.

Figure 3:
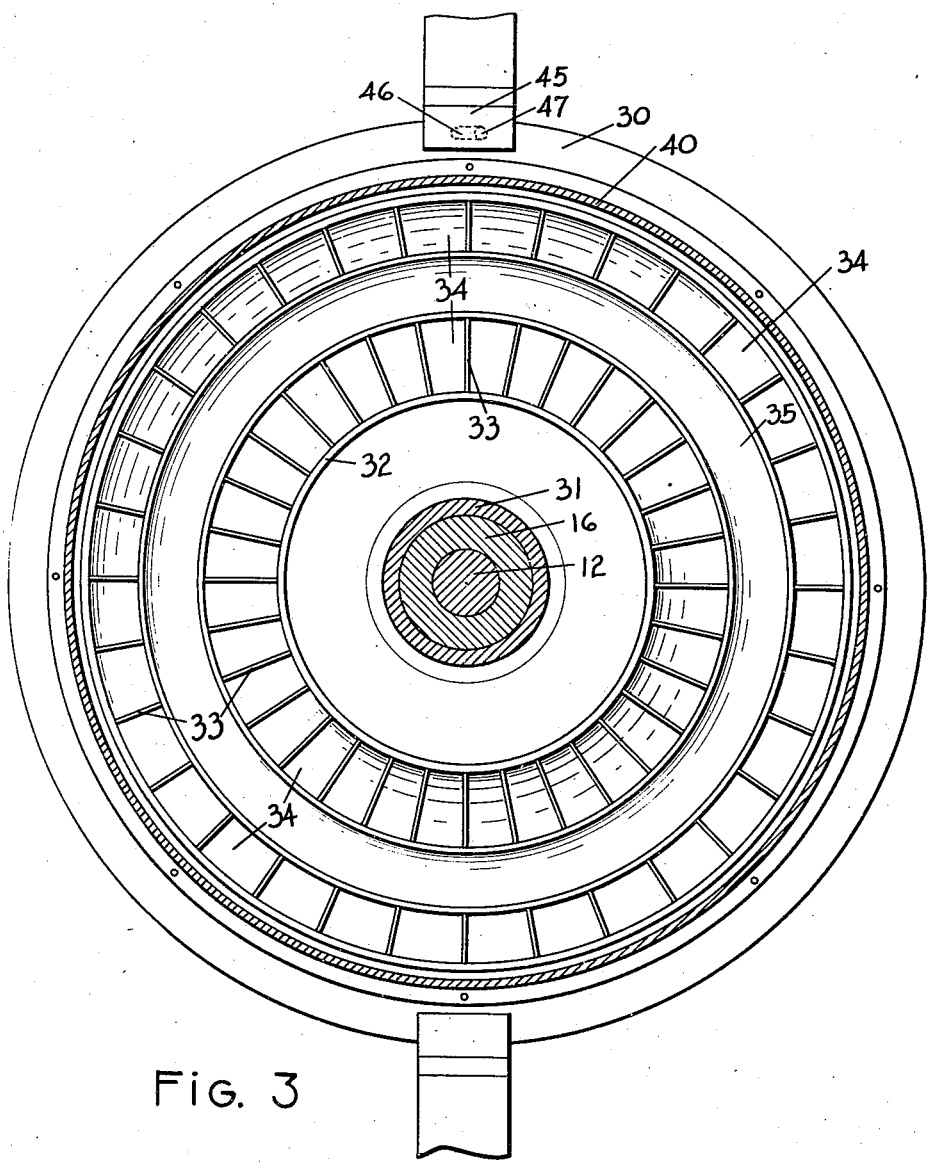
Fig. 3 shows a cross-section between two torus fluid members through line 3—3 Fig. 1.

Referring to the drawings, numeral 1 is used to designate a rigid case of circular cross-section Fig. 1, which is adapted to rotate about an axis carrying bevel gears rotatable on axes arranged radially to said axis, Fig. 1, as hereinafter set forth.

Numeral 2 is a driving shaft provided with splines 3 to be coupled to the motor shaft, not shown in the drawings.

A tubular extension 4 of the drive shaft 2, carries a bevel pinion 5 which is in mesh at points $a$ with bevel gears 6. Other bevel gears 7 of lesser diameter are attached on the inner side of said bevel gears 6 for rotation therewith.

Number 9 designates radial axles embedded at one of its ends in the case 1 and attached at its other ends to a ring 11, Fig. 1, by which transmission shaft 12 passes through into the tubular extension 4 of shaft 2, wherein it is supported.

A pinion 15, attached to the shaft 12 is in mesh with gears 7 at points $b$.

The gearing points $a$ and $b$ are on the same side, with regard to axles 9.

A tubular shaft 16 concentric with shaft 12 extending out of case 1, and independently rotatable upon shaft 12, is provided with oil retainer 18, Fig. 1, and carries a bevel pinion 17 which is in mesh with gears 6 at points $d$ at the opposite side from points $a$ with regard to axles 9, Fig. 1.

At one end case 1 is supported upon tubular extension 4 of the drive shaft 2, through sealed-bearings 8, to avoid leakage of any oil therein contained. At its other end said case 1 rests upon tubular shaft 16 through sealed-bearings 10, Fig. 1.

The pinion attached to the tubular shaft 16 may either be in mesh with gears 6 at points $d$, as shown in full-lines 17, Fig. 1, or be in mesh with gears 7 at points $c$, as shown in dotted-lines 19, Fig. 1.

A torus fluid shell 23, attached to case 1, by means of support 22, has vanes 24 welded radially in the mentioned shell 23, forming radial cells 34, Fig. 3. I shall call this assembly, constituted of parts 22, 23, 24, Fig. 1, driving member A.

A torus fluid shell 26, attached to tubular shaft 16, by means of support 27, has vanes 28 welded radially in the mentioned shell 26, forming radial cells 34, Fig. 3. I shall call this assembly constituted of parts 26, 27 and 28, Fig. 1, driving member B.

A flat disc wheel 30, fastened on hub 31, which rotates independently upon shaft 16, is provided with fluid retainer 44, and is located between the two mentioned driving members A and B.

A double action torus fluid shell 32 is supported by the mentioned disc wheel 30, and is located in front and facing the mentioned driving member A. This member shell 32 has vanes 33 welded radially in it, forming radial cells 34, Fig. 3. A torus channelled ring 35 is embedded in the mentioned vanes 33, and is concentric with the aforementioned shell 32. I shall call this assembly, constituted of parts 32, 33 and 35, Fig. 1, double action member C.

A second double action torus fluid shell 36 is supported by the mentioned disc wheel 30, but on the opposite side of the double action member C, that is, in front and facing the driving member B. This member shell 36 has vanes 37 welded radially in it, forming radial cells 34, Fig. 3. A torus channelled ring 39 is embedded in the mentioned vanes 37, and is concentric with the aforementioned shell 36. I shall call this assembly, constituted of parts 36, 37 and 39, Fig. 1, double action member D.

A "one-way" brake system constituted by a bracket to be attached to the frame or chassis, not shown in the drawings, has formed on the other end two flat jaws 45, each having a perpendicular channeled groove 46 in the inner portion, which is deeper in the upper portion. The outer part of the disc wheel 30 rotates between the two mentioned jaws 45. A steel ball 47 is deposited in each of the mentioned grooves 46, contacting said grooves on one side and the faces of the mentioned disc wheel 30 on the other side, this will act as a brake when the disc wheel tends to turn in the direction from the upper portion of the grooves, toward the bottom portion, driving the steel balls to the narrower or bottom portion of the mentioned grooves 46, thus compressing the steel balls 47 between the faces of the disc wheel 30 and the inner portion of the bracket jaws 45, hence providing the braking action. The brake is released when the rotation of disc wheel 30 is reversed, thus tending to drive the steel balls 47 to the upper portion of the grooves 46, which being deeper, hence releases the compression of the steel balls 47 between the disc wheel 30 and the bracket jaws 45.

Two fluid torus member housing or covers 40 and 41 are fastened to the disc wheel 30, one on each side, and are provided with fluid retainers 42 and 43, respectively, to avoid leakage of any fluid therein contained. These covers 40 and 41 are provided with filler plugs, not shown in the drawings.

The above mentioned fluid torus members consist of two elements that form a pair or complete unit, being two pairs, members A and C and members B and D, which revolves with no mechanical connection between the two elements of each pair. The covers 40 and 41 being partly filled with fluid.

The motion of the fluid driving members A and B around their axes causes the fluid to rotate around the same axes. Being acted upon by centrifugal force and owing to the shape of the cells 34 the fluid also rotates around an axis which is circular and at right angles to the axis of rotation of the driving members. As the fluid flows from the cell 34 of the driving members A and B to the cells 34 of the double action members C and D, it impinges on the walls of the cells of these members. It is this combination of rotation and spiral motion of the fluid between the two members that tends to cause the action on the double action members C and D. When the driving speed is very low, the combined forces acting on the fluid causes the fluid to move outward, through the driving members cells and it then returns to the starting point. However, the baffle rings 35 and 39 placed between the two elements interfere with the flow of fluid reducing the actuating effort or torque to such point that the transmission shaft 12 will not move. When the driving members A and B are turning at higher speed the forces acting are greater and the fluid enters the double action members C and D cells under much greater force and speed. The baffle rings 35 and 39 are no longer effective as the force has moved the fluid out of the range of the baffle rings and the fluid becomes a revolving mass. As soon as the speed is high enough to cause this condition outside the range of the baffle rings it will actuate on the double action members C and D.

The driving member A, attached to the case 1 is gradually stopped by the fluid braking action of the double action member C, which will act as a brake at that moment, due to its being attached to the disc wheel 30, which is also braked in that turning direction, and released in the opposite turning direction, by means of the described "one-way" braking system, constituted of parts 45 and 47, Figs. 1, 2 and 3.

The driving member B, attached to tubular shaft 16 is gradually stopped by the fluid braking action of the double action member D, which will act as a brake at that moment, due to its being attached to the disc wheel 30, which is also braked in that turning direction, and released in the opposite turning direction, by means of the described "one-way" braking system, constituted of parts 45 and 47, Figs. 1, 2 and 3.

The gripping effort in each one of the two pairs of fluid members A and C and members B and D may be varied by filling the two pairs of members with fluids of different viscosity; or by constructing said pairs of members in different diameters; or by constructing these two pairs of members with different numbers of actioning vanes, which thus provide a compensation between the efforts of the two pairs of torus fluid members.

The whole transmission assembly is supported upon shaft 12, said shaft rests on supports 13 and 14 through bearings 20 and 21.

*Functioning*

Supposing that the shaft 12 is still, and consequently its pinion 15, then when gears 6 receive the stress from pinion 5, they will act as levers upon their axles 9, having as fulcrum the gearing points b on the gears 7 with the pinion 15, which is still, this will cause the radial axles 9 to revolve, causing the transmission case 1 and so the fluid driving member A to turn in the opposite direction to the shaft 2. In this condition, if by means of the double action fluid member C, which will act as a brake at that moment, the fluid driving member A together with case 1 is held, that is, its speed is lowered without altering the speed of the shaft 2, we shall have that the difference of motion will be transmitted to the pinion 15, therefore to shaft 12. As case 1 is gradually braked, the speed of the shaft 12 will increase until reaching the speed and power equivalent to low or first in the actual changes of speeds.

Supposing that the shaft 12 is still, and consequently its pinion 15, then when gears 6 receive the stress from pinion 5, they will act as levers upon gearing points d of pinion 17 and gears 6, having as a fulcrum the gearing points b on the gears 7 with pinion 15, which is still, will cause pinion 17 together with the tubular shaft 16 and fluid driving member B to rotate in the opposite direction to the shaft 2. In this condition, if by means of the double action fluid member D, which will act as a brake at that moment, the fluid driving member B together with the tubular shaft 16 and pinion 17 is held, that is, its speed is lowered, without altering the speed of shaft 2, we shall have that the difference of motion will be transmitted to pinion 15, therefore to shaft 12. As the pinion 17 is gradually braked, the speed of shaft 12 will increase until reaching the speed and power equivalent to high speed gear.

As it is seen, when shaft 12 is still, both fluid driving members A and B will rotate in the reverse direction of shaft 2, and at different speeds. This is due to the difference in gear ratios operating these two fluid driving members A and B; and due to the same reason, these two mentioned fluid driving members A and B are receiving a braking action from the double action fluid members C and D at the same time, and the shaft 12 will be receiving a compounded turning effort or torque, provided by the two different gear ratios.

When the resistance of the shaft 12 is great, the fluid driving member B, that is, the one with higher gear ratio and lighter viscosity fluid if necessary, will slip somewhat due to the excessive stress, then part of the stress is taken by the fluid driving member A, which actuates the lower gear ratio, assisted by the stress provided by the high gear ratio turning effort. This results in a "resultant" low gear ratio torque, comprised between low speed gear ratio and high speed gear ratio. As soon as the high speed gear ratio has sufficient power to overcome the resistance of shaft 12, the case 1 together with the fluid driving member A will rotate in the direction of shaft 2. Then as shaft 12 progressively gains speed and thus releases resistance, there will be gradually less slippage of the fluid driving member B. As this gradual slippage is reduced, the "resultant" gear ratio torque, comprised between low speed gear ratio and high speed gear ratio, will gradually go up to the high speed gear ratio torque. Then the fluid driving member A, which being rotating in the direction of shaft 2, will drive the double action fluid member C with it, hence the double action fluid member D, and with it, the fluid driving member B is also driven, providing an interlocking of the pinion 17 gears 6 and axles 9, which will produce the direct-drive of the drive shaft 2 and the transmission shaft 12.

I claim:

1. In a differential transmission the combination of a drive shaft; a transmission shaft coaxial with the drive shaft; supporting means applied at two points within the length of the transmission shaft; a transmission case independently rotatable upon the shafts; bevel gears rotatable in the transmission case on axes arranged radially to the axis of the shafts; bevel gears of lesser diameter attached on the inner side of the first bevel gears for rotation therewith; a bevel pinion carried by the drive shaft in meshing relation with the large bevel gears for drive of the same; a bevel pinion carried by the transmission shaft in meshing relation with the small bevel gears, all meshings being at same side of their axes of rotation; a tubular shaft independently rotatable upon the transmission shaft; a bevel pinion carried by the tubular shaft in engagement with the large bevel gears at the opposite side of their axes of rotation with regard to the above mentioned meshings; two double action torus fluid members rigidly joined and independently rotatable upon the aforementioned tubular shaft; means to brake these two double action torus fluid members in one turning direction and release them in the opposite turning direction; a torus fluid driving member attached on the outside of the transmission case facing one of the two mentioned double action torus fluid members for fluidly holding the transmission case against rotation for effecting a low speed drive; a torus fluid driving member attached on the other end of the tubular shaft facing the other one of the two mentioned double action torus fluid members for fluidly holding the tubular shaft against rotation for effecting a high intermediate speed drive; means providing a fluid coupling action among the four torus fluid members for effecting a direct drive of the drive shaft and the transmission shaft; and two covers attached one on each side of the mentioned double action torus fluid members for maintaining the fluid inside the fluid members.

2. The combination of two double action torus fluid members rigidly joined and rotatable upon an axis; means to brake these two double action torus fluid members in one direction and release them in the opposite direction; a torus fluid driving member located coaxially with, and facing one of the two mentioned double action fluid members for receiving a braking action from it in one direction, and for propelling it in the opposite direction; a second torus fluid driving member located coaxially with, and facing the other one of the two mentioned double action torus fluid driving members for receiving a braking action from it in one direction, and to be propelled by it in the opposite direction; and two covers attached, one on each side of the mentioned double action torus fluid members for maintaining the fluid inside the fluid members.

FRANCISCO F. LÁZAGA.